United States Patent [19]

Litjens et al.

[11] Patent Number: 4,836,151

[45] Date of Patent: Jun. 6, 1989

[54] TWO CYCLE ENGINE WITH TURBULENCE GENERATOR AT REED VALVES

[75] Inventors: John J. Litjens, Omro; John M. Griffiths, Fond du Lac; Robert J. Baumhardt, Eden, all of Wis.

[73] Assignee: Brunswick Corporation, Skokie, Ill.

[21] Appl. No.: 175,845

[22] Filed: Mar. 31, 1988

[51] Int. Cl.[4] ........................ F02B 33/04; F16K 15/14

[52] U.S. Cl. ................................ 123/65 V; 123/73 V; 137/855; 251/126

[58] Field of Search ................. 123/65 A, 65 V, 65 P, 123/73 V, 73 A, 52 M, 73 PP; 137/855, 856; 251/120, 126

[56] References Cited

U.S. PATENT DOCUMENTS 4,228,770 10/1980 Boyesen ............................ 123/73 V
4,356,798 11/1982 Sakaoka et al. .................. 123/73 V
4,474,145 10/1984 Boyesen .......................... 123/73 PP
4,474,163 10/1984 Linder et al. ...................... 123/73 V
4,690,107 9/1987 Emler et al. ....................... 123/73 V

FOREIGN PATENT DOCUMENTS 0018866 1/1982 Japan .................................. 137/856

*Primary Examiner*—David A. Okonsky
*Attorney, Agent, or Firm*—Andrus, Sceales, Starke & Sawall

[57] ABSTRACT

In a two cycle internal combustion engine (2), a turbulence generator (70) is provided by a freely rotating fan (72) in the fuel-air stream to the reed valves (16) which supply the fuel-air mixture into the crankcase chamber (8). The freely rotating fan (72) is driven by the fuel-air mixture flow and rotates to generate turbulence to provide more uniform distribution of the fuel-air mixture.

8 Claims, 2 Drawing Sheets

TWO CYCLE ENGINE WITH TURBULENCE GENERATOR AT REED VALVES

BACKGROUND AND SUMMARY

The invention relates to two cycle internal combustion engines, and more particularly to fuel-air intake structure providing more uniform distribution of the fuel-air mixture.

Two cycle engines are subject to puddling of fuel and poor fuel distribution. Heavy fuel ends condense to the walls of the crankcase and accumulate in the lowest part of the crankcase. Various systems are known for recirculating heavy fuel ends back into the crankcase for subsequent combustion.

The prevent invention addresses and minimizes the above noted problems. The invention may be used in combination with recirculation systems if desired.

In the present invention, a turbulence generator is provided in the air stream between the outlet of the fuel system and the reed block and generates turbulence to provide more uniform distribution of the fuel-air mixture. The turbulence generator is a freely rotating fan between the reed block and the carburetor venturi or other air intake for fuel injection or the like. The fuel-air mixture flow stream causes rotation of the fan, which in turn provides a more uniform distribution of fuel. The more uniform distribution of fuel also enables a smaller main carburetor jet, which increases fuel economy.

DESCRIPTION OF PRIOR ART

Figure 1:
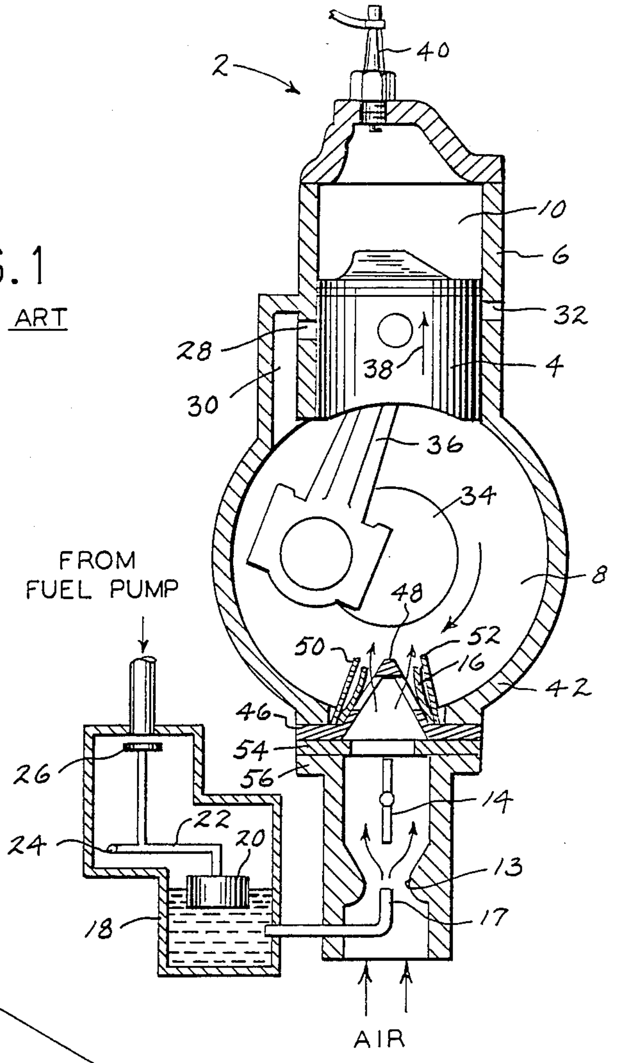
FIG. 1 PRIOR ART
FIG. 1 is a schematic illustration of a two cycle internal combustion engine, as known in the prior art.

FIG. 1 shows one cylinder of a two cycle crankcase compression internal combustion engine 2. A piston 4 is reciprocal in a cylinder 6 between a crankcase chamber 8 and a combusion chamber 10. A carburetor 12 having a venturi 13 supplies fuel and air as controlled by throttle valve 14 into crankcase chamber 8 through one-way reed valves 16. The carburetor includes a fuel outlet nozzle or jet 17 at venturi 13. The carburetor includes a float bowl 18 having a float 20 connected to lever 22 pivoted at 24 to open or close valve 26 to admit or block fuel from the fuel pump. There is a fuel-air inlet port 28 in combustion chamber 10. A fuel-air transfer passage 30 extends between crankcase chamber 8 and fuel-air inlet port 28. Exhaust port 32 is provided in the combustion chamber through the cylinder wall. Piston 4 is connected to crankshaft 34 by connecting rod 36.

In operation, piston 4 has a charging stroke in the upward axial direction shown at arrow 38 compressing fuel-air mixture in combustion chamber 10 and creating a vacuum in crankcase chamber 8, which vacuum opens reed valves 16 and draws fuel-air mixture therethrough into crankcase chamber 8. Piston 4 has a power stroke upon combustion of the mixture in chamber 10 by spark plug 40 driving piston 4 downwardly in the opposite axial direction pressurizing crankcase chamber 8 and forcing fuel-air mixture to flow from crankcase chamber 8 through transfer passage 30 to fuel-air inlet port 28 in combustion chamber 10 for reptition of the cycle. The spent combustion products are exhausted through exhaust port 32.

Figure 2:
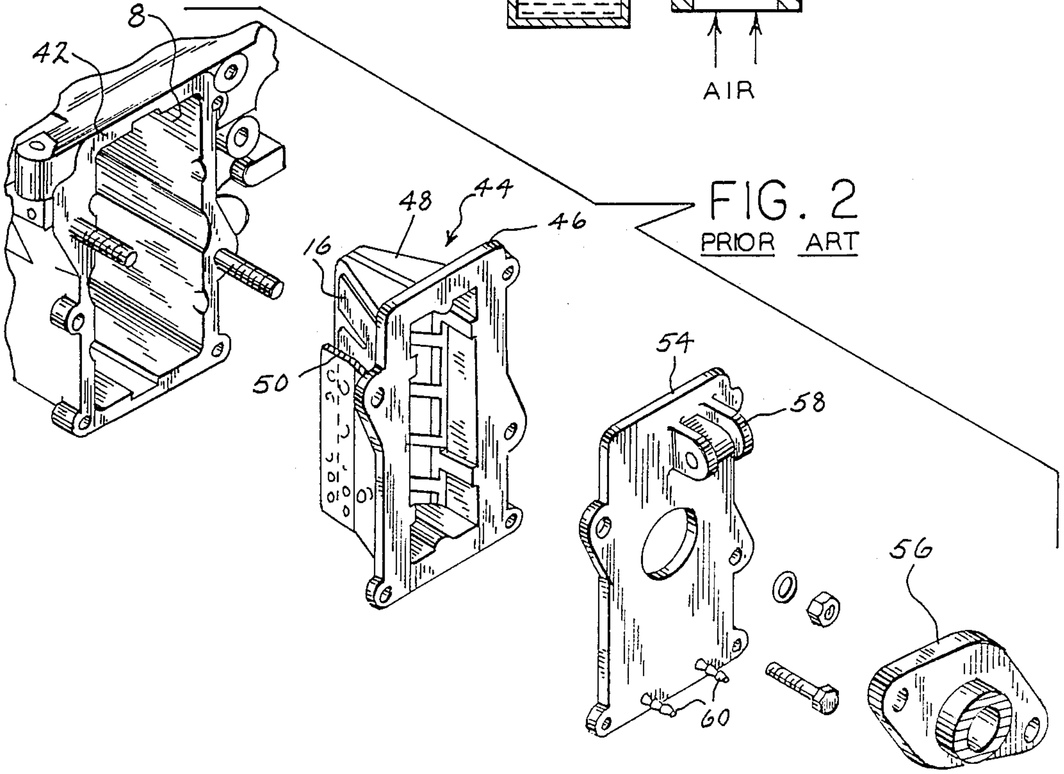
FIG. 2 PRIOR ART
FIG. 2 is an exploded perspective view of a crankcase, reed block and carburetor adapter plate, known in the prior art.

FIG. 2 shows a portion of crankcase 42 to which reed valves 16 are mounted. Reed valves 16 are part of a reed valve block 44. The reed block has an outer flange 46 mounted to crankcase 42 and has an integral V-shaped portion 48 extending into crankcase chamber 8. The sides of V-shaped portion 48 have a plurality of apertures which are covered by the plural reed valves 16 which are thin sheet metal members which flex away from V-shaped portion 48 to an open condition when there is a vacuum in crankcase chamber 8 due to the charging stroke of piston 4. The flexible flap reed valves 16 move inwardly against V-shaped portion 48 to a closed condition when crankcase chamber 8 is pressurized due to the power stroke of piston 4. The reed valves 16 are anchored at their base sections to V-shaped portion 48 adjacent flange 46. The reed block also includes rigid outer guard plates 50, 52 which prevent over-flexure of the reed valves 16. An adapter plate 54 is mounted to outer flange 46 of reed block 44. The base 56 of carburetor 12 is mounted to adapter plate 54. Only the base of the carburetor is shown in FIG. 2. Upstanding boss 58 on adapter plate 54 pivotally mounts the carburetor linkage (not shown), and port studs 60 are for recirculation of fuel.

DESCRIPTION OF THE INVENTION

Figure 3:
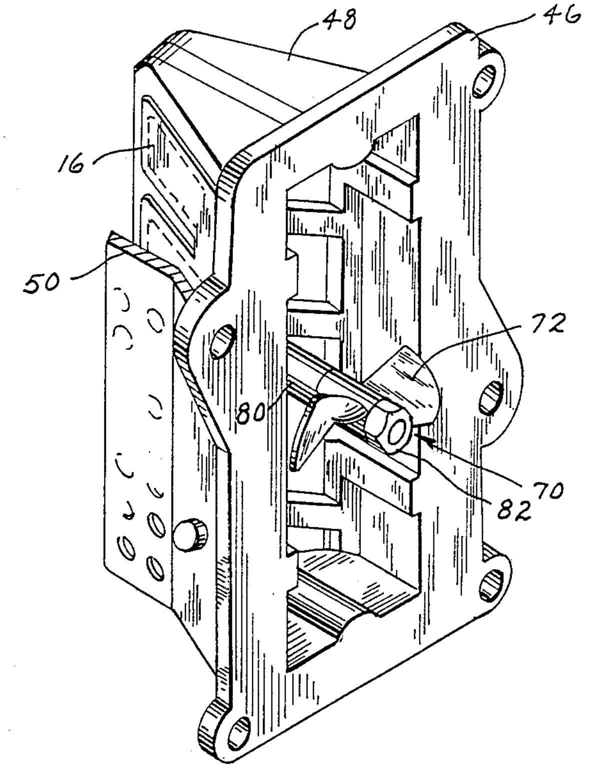
FIG. 3 is a perspective view of a turbulence generator in accordance with the invention.
Figure 4:
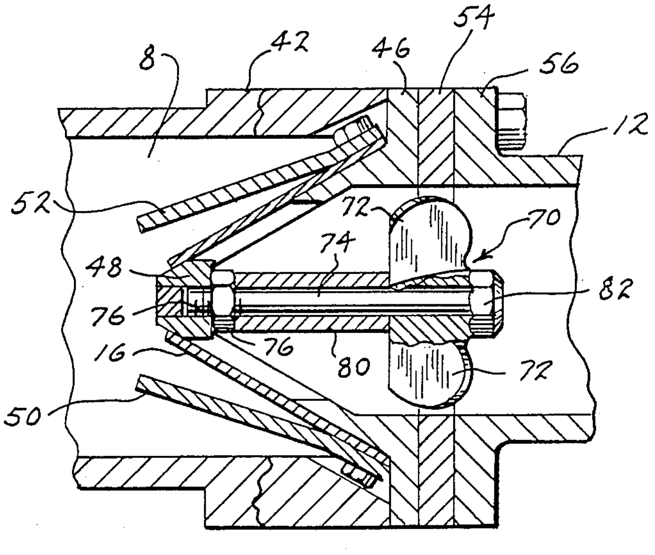
FIG. 4 is a sectional view of the structure of FIG. 3 mounted to a crankcase.

FIGS. 3 and 4 use like reference numerals from FIGS. 1 and 2 where appropriate to facilitate clarity. FIGS. 3 and 4 show a turbulence generator 70 in the fuel-air stream to the reed block. Turbulence generator 70 generates tubulence to provide more uniform distribution of the fuel-air mixture.

Turbulence generator 70 is a fan 72 mounted to reed block 44. As seen in FIG. 4, a central stud 74 is threaded into the base of V-shaped reed block portion 48, as shown at threads 76, and has a nut 78 and spacer sleeve 80 spacing fan 72 rightwardly, FIG. 4, of the reed valves and generally at the base 56 of the carburetor, downstream of venturi 13 and fuel outlet jet 17. Retaining nut 82 holds fan 72 on stud 74 and is a self-gripping type nut and allows free rotation of fan 72. As the fuel-air mixture flows leftwardly, FIG. 4, into crankcase chamber 8, such flow causes rotation of fan 72 and hence more uniform distribution of the fuel-air mixture. Other types of fans contemplated within the invention include turbines, squirrel cages, etc.

It is recognized that various equivalents, alternatives and modifications are possible within the scope of the appended claims.

We claim:

1. A two cycle internal combustion engine comprising a piston reciprocal in a cylinder between a combustion chamber and a crankcase, a reed block mounted to said crankcase and having one or more reed valves and admitting a fuel-air mixture to said crankcase, a fuel-air supply system supplying said fuel-air mixture to said reed block, a turbulence generator in the fuel-air stream to said reed block and generating turbulence to provide more uniform distribution of said fuel-air mixture, said turbulence generator being movable relative to said crankcase and being moved by flow of said fuel-air stream therepast.

2. A two cycle internal combustion engine comprising a piston reciprocal in a cylinder between a combustion chamber and a crankcase, a reed block mounted to said crankcase and having one or more reed valves and admitting a fuel-air mixture to said crankcase, a fuel-air supply system supplying said fuel-air mixture to said reed block, a turbulence generator in the fuel-air stream to said reed block and generating tubulence to provide more uniform distribution of said fuel-air mixture, wherein said turbulence generator comprises a fan in said fuel-air stream.

3. The invention according to claim 2 wherein said fuel-air system has an outlet upstream of said reed block, and wherein said fan is between said fuel-air system outlet and said reed block.

4. The invention according to claim 3 comprising mounting structure mounting said fan to said reed block.

5. The invention according to claim 4 wherein said mounting structure is attached to said reed block and includes spacer structure spacing said fan upstream of said reed valves.

6. The invention according to claim 5 wherein said mounting structure includes an axial stud extending generally parallel to the flow direction of said fuel-air mixture stream, and wherein said fan is mounted on said stud and rotates about the axis of said stud which rotational axis is parallel to said flow direction of said fuel-air mixture stream therepast.

7. The invention according to claim 6 wherein said reed block includes an outer flange mounted to said crankcase and an inner portion extending toward said piston and to which said reed valves and said stud are mounted, and wherein said fan is spaced outwardly from said inner portion and is substantially laterally aligned with said outer flange.

8. The invention according to claim 7 comprising an adapter plate mounted to said outer flange, and a carburetor base mounted to said adapter plate, and wherein said fan is substantially laterally aligned with said outer flange and said adapter plate and said base of said carburetor.

* * * * *